L. MOORE.
ANCHORING AND WINDING DEVICE FOR DECOYS.
APPLICATION FILED NOV. 1, 1920.
1,370,145.
Patented Mar. 1, 1921.
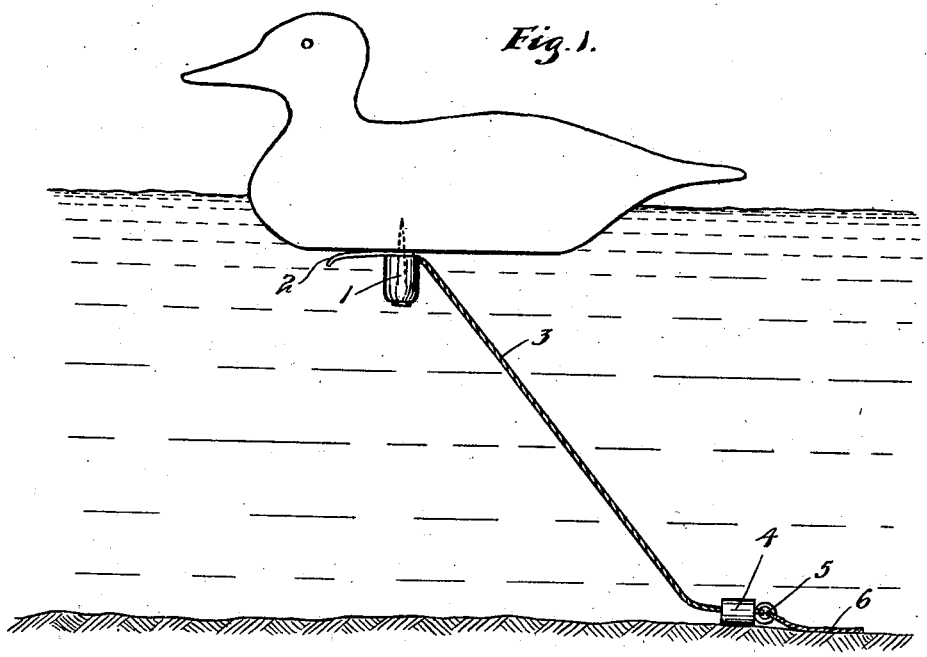
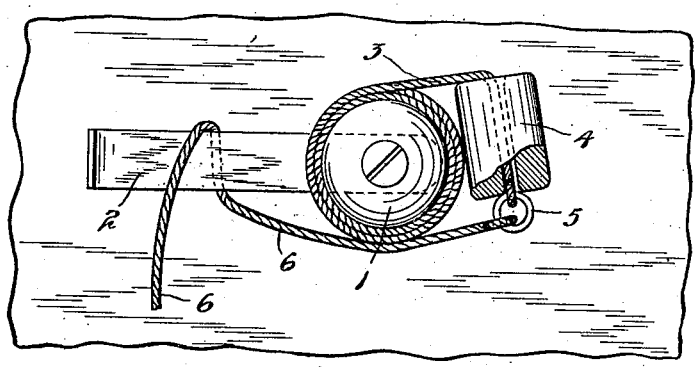
INVENTOR.
LOUIS MOORE
BY HIS ATTORNEY.
James F. Williamson

UNITED STATES PATENT OFFICE.

LOUIS MOORE, OF MINNEAPOLIS, MINNESOTA.

ANCHORING AND WINDING DEVICE FOR DECOYS.

1,370,145.

Specification of Letters Patent.

Patented Mar. 1, 1921.

Application filed November 1, 1920. Serial No. 420,993.

*To all whom it may concern:*

Be it known that I, LOUIS MOORE, a citizen of the United States, residing at Minneapolis, in the county of Hennepin and State of Minnesota, have invented certain new and useful Improvements in Anchoring and Winding Devices for Decoys; and I do hereby declare the following to be a full, clear, and exact description of the invention, such as will enable others skilled in the art to which it appertains to make and use the same.

This invention relates to a decoy, such as a decoy duck adapted to be placed upon the water, and particularly, to a combined anchoring and cord winding and securing device for the same. It is customary to anchor the decoy is a desired location by means of weighted cords or cables. When the decoys are taken from the water and placed in a boat, or some storing receptacle, these cords are very apt to become twisted and tangled, so that when it is again desired to use the decoys, much valued time is lost in getting the decoys ready for use. When a hunter arrives at the hunting ground, he is quite anxious to start the sport, and it is, therefore, very desirable to have decoys that can be quickly placed in the water for use.

It is an object of this invention, therefore to provide a decoy having means thereon by which the cord can be easily kept in an untangled condition.

A further object is to provide a decoy having such a means thereon which will afford great ease and rapidity in getting the decoys into proper position in the water.

Other objects of the invention will be apparent from the following description made in connection with the accompanying drawings in which like reference characters refer to the same parts in all of the views, and in which—

Figure 1 represents a perspective view of the decoy in position in the water with applicant's novel anchoring device attached thereto; and Fig. 2 is a bottom plan view of the device showing the cord in wound and secured position.

Referring to the drawings, the body of the decoy is shown in Fig. 1 and has secured to the underside and centrally transversely thereof, a member 1, which is suitably held in place by a screw or other desired means, and a flat spring member 2 secured by the same fastening means is disposed between the member 1 and the body of the decoy and which extends forwardly of the member 1 and is formed with a slightly downturned end. A cord or other flexible cable member 3 is secured in any desired manner to the member 1 near the body of the decoy and has threaded thereon an anchoring or weight member 4. Beyond this weight member the cord is provided with suitable retaining means shown as a ring 5, to which is also secured a length of rope 6 which forms a securing portion. It will be noted that the member 1 is formed with a rounded portion at its lower end which merges on a smooth curve with the side portion and bottom portion thereof.

When the decoy is not in use, the cable 3 will be wound around the member 1, as shown in Fig. 2, the weight member will be placed or pulled in position against the wound coil and the securing member 6 of the rope will then be drawn under the spring 2 and be gripped between the same and the body of the decoy. The cord and weight member will thus be firmly held in its neatly arranged relation. The enlarged end of member 1 will prevent the cord from readily slipping over said end, so that the decoys may be handled or thrown about with no danger of the cord becoming unwound. When it is desired to again use the cord, the end 6 of the rope will be pulled out from under the spring 2 and the decoy can then be immediately placed on the water. The weight 4 will sink and unwind the cord from the member 1 until the said weight reaches the bottom of the water where it will rest and form an anchor for the decoy. If a few strands remain wound about member 1 after the weight is resting on the bottom, the motion of the decoy by the wind will cause a strain to be placed upon the cable and the remaining strands will gradually unwind, but will turn the decoy gradually on the surface of the water. This will result in more perfect simulation of a live bird.

If desired, the member 1 may be of sufficient weight to also act as a keel member to retain the decoy in upright position upon the water to prevent the same from being blown over by the wind. This member may also be so secured that it will not readily turn, but yet may be turned by the exertion of some force. If thus secured, when the decoy is taken from the water, said member can be turned by gripping the rounded end with the fingers and the cable 3 can then be wound thereon without said cable coming in contact with the hand. This cable is wet and often cold or muddy and too much handling thereof is objectionable. The member 1 cannot, of course, turn loosely on its securing means.

While as shown in Fig. 2, the cable member 6 is passed only once under the spring 2, it will be understood that this cable portion can be drawn tightly under the spring and then again wound around the member 1 over the cable portion 3 and its attached weight 4 and the end again securely fastened under the spring portion. This will form a locking means for the cable and will absolutely prevent the same from slipping off of the member 1.

It will, of course, be understood that various changes may be made in the form and details of the device without departing from the scope of applicant's invention, which, generally stated, consists in the matter shown and described and set forth in the appended claims.

What is claimed is:

1. An anchoring and securing device for a decoy having in combination a member secured in fixed relation to the bottom of the decoy and adapted to have a cable member wound thereon, a cable secured to said member, a weight member threaded on said cable, a retaining device on said cable beyond said weight member, a short length of cable secured to said retaining member, and a securing means on the decoy for holding said short length of cable when the cable is wound about said first mentioned member.

2. An anchoring and securing device for a decoy having in combination a spool member fixed and secured to the bottom of the decoy, adapted to have a cord wound thereabout and comprising means for retaining the cord thereon, a cord member secured to the said spool, a weight member secured near the other end of said cord, retaining means secured to the end of the cord beyond said weight, a fastening section of cord secured to said retaining means, and a fastening means on said decoy adapted to clamp and hold said fastening cord in a desired position.

3. An anchoring and securing device for a decoy having in combination a spool member fixedly secured to the bottom of said decoy, a flat spring having a slightly outturned end also secured to the bottom of said decoy, a flexible member secured to said spool member, a weight member secured near the end of said flexible member and a second flexible member secured to the end of said first flexible member adapted to be passed between said spring and the decoy to hold the flexible member in position when the same is wound upon the spool.

4. An anchoring and securing device for a decoy having in combination a keel member formed as a cylindrical spool having a rounded end secured to the bottom of the decoy, a flat spring member secured between said keel member and to the bottom of the decoy, a flexible member secured to said keel member, a weight member secured to said flexible member, a second flexible member secured to the first flexible member beyond the weight member, said second flexible member adapted to be clamped between the said spring and the bottom of the decoy when the first flexible member is wound about the keel member.

In testimony whereof I affix my signature.

LOUIS MOORE.